June 1, 1965 M. COHN 3,186,772

TELESCOPIC MOUNTING BRACKET

Filed July 11, 1962

INVENTOR
MAX COHN

BY Amster + Levy
ATTORNEYS 3,186,772

TELESCOPIC MOUNTING BRACKET

Max Cohn, East Brunswick, N.J., assignor to South River Metal Products Co. Inc., South River, N.J., a corporation of New Jersey Filed July 11, 1962, Ser. No. 209,065
1 Claim. (Cl. 308—3.8)

This invention relates to a telescopic mounting bracket adapted to slidably support drawers, shelves, etc., and in particular to a device for slidably supporting a phonograph record player turntable in a cabinet so that when the turntable is slid outwardly of the cabinet the bracket serves to mount the phonograph record player in a manner so as to eliminate vibrations and relative movement or play.

In the past, various types of guides, brackets, or slide supports have been devised and used for movably supporting a phonograph record player in a cabinet or the like. The phonograph record player is adapted to be moved outwardly of the cabinet so that phonograph records may be easily placed thereon and so that the phonograph record player may be conveniently operated. Because of the nature of the mounting brackets heretofore used, there has been considerable relative movement or play between the parts of the mounting brackets such that the phonograph record player and the brackets vibrate and rattle to a considerable extent during operation of the phonograph record player reducing the quality of sound reproduction.

Attempts have been made to alleviate this condition by the insertion of springs into each bracket but this has proved to be unsatisfactory due to the fact that the springs of necessity are of a lighter weight and are considerably weaker than the bracket, and the springs quickly fatigue so as to permit relative movement between the parts of the bracket.

Further, the springs often break off which causes additional rattling noises while increasing vibration. Furthermore, by the very nature of the device, the insertion of springs or like elements in the mounting bracket will increase the friction between the various parts and render the operation and movement of the phonograph record player into and out from the cabinet more difficult.

It is therefore an object of the present invention to overcome the aforesaid disadvantages of prior mounting brackets.

Another object of the present invention provides the means for resiliently mounting the parts of a telescopic bracket for relative sliding movement therebetween without permitting any looseness or play and which includes means for damping rattling and vibration.

A further object of the present invention resides in the provision of means for preventing play and vibrations which may exist in a telescopic mounting bracket by resiliently mounting ball bearings employed between inner and outer sections of the bracket, while eliminating the necessity for leaf springs, coil springs, or other external or separately mounted resilient members.

In accordance with an illustrative embodiment of the invention there is provided a telescopic mounting bracket for mounting the chassis of a phonograph record player or the like which comprises an outer track including first and second outer side walls formed with first and second longitudinally extending outer grooves. An inner track is provided and is telescopically slidably mounted in the outer track and includes first and second inner side walls formed with first and second longitudinally extending inner grooves. The grooves define longitudinally extending first and second raceways therebetween and a carriage including a base wall and first and second intermediate side walls is disposed in the raceways. The first and second side walls are provided with flexible extensions and mounted in these extensions are ball bearings which are in rolling contact within the raceways. Since the inner and outer tracks are formed such that the raceways form a resilient force fit for the ball bearings, the extensions will normally be somewhat flexed incident to the assembly of the carriage with the inner and outer tracks. The ball bearings will engage the inner and outer tracks under stress, with the outer track being under tension and the inner track being under compression and with the extensions flexing to substantially equalize the stress on the inner and outer tracks to establish a rattle-proof sliding fit between the inner and outer tracks.

Still further objects and features of the invention reside in the provision of a telescopic mounting bracket that is simple in construction, easy to install, relatively inexpensive, and which is efficient in operation.

These, together with the various ancillary objects and features of the invention which will become apparent as the following description proceeds, are attained by this telescopic mounting bracket, a preferred embodiment of which has been illustrated in the accompanying drawings, by way of example only, wherein.

Figure 1:
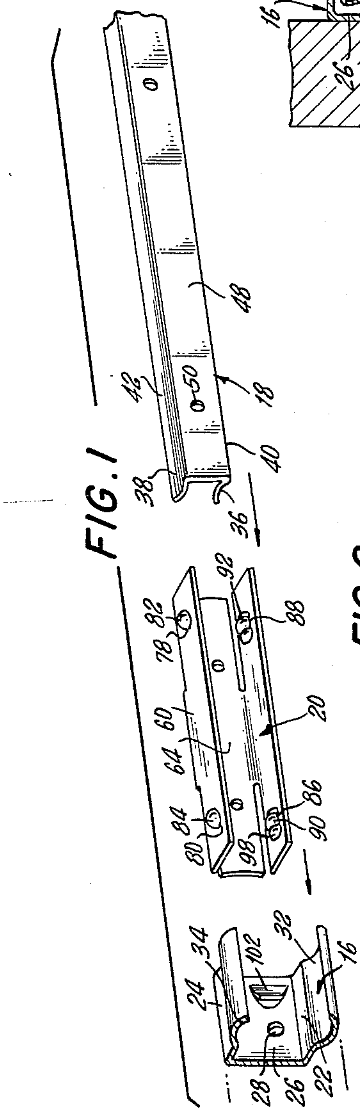
FIG. 1 is an exploded perspective view of an embodiment of the telescopic mounting bracket constructed in accordance with the concepts of the present invention.
Figure 2:
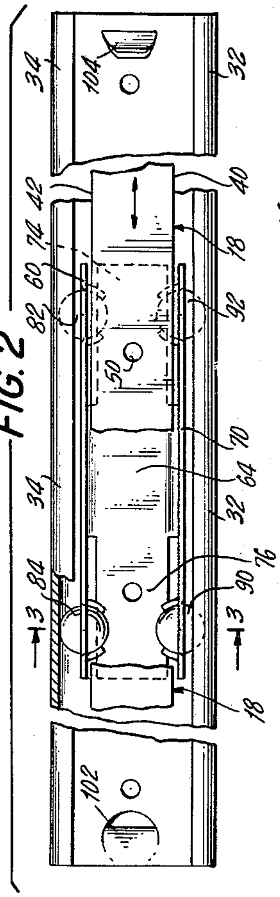
FIG. 2 is an enlarged elevational view of the telescopic mounting bracket with parts thereof being broken away showing other parts in section for greater clarity.
Figure 3:
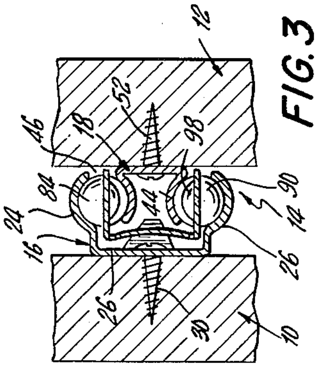
FIG. 3 is a sectional detail view, taken along the plane of line 3—3 in FIG. 2, particularly illustrating the relative arrangement between the outer track, the carriage and the inner track.
Figure 4:
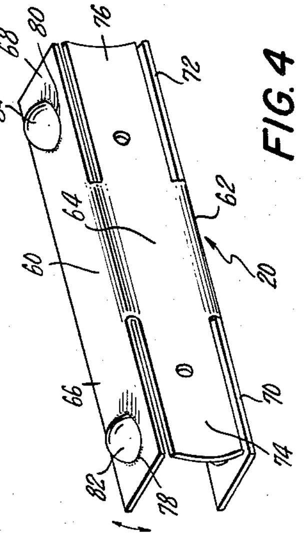
FIG. 4 is a perspective view of the carriages.
Figure 5:
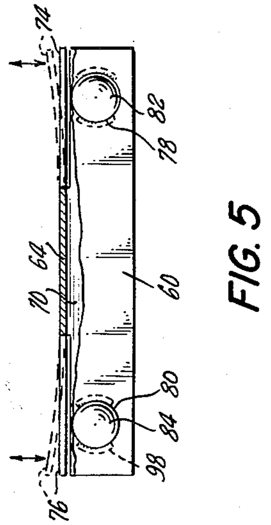
FIG. 5 is an elevational view of the carriage with parts being broken away showing other parts in section.

With continuing reference to the accompanying drawings wherein like reference numerals designate similar parts throughout the various views, reference numeral 10 is used to generally designate a portion of a cabinet or like fixed unit while reference numeral 12 indicates a portion of the chassis or turntable mounting of a phonograph record player, shelf, drawer or the like movable part which is mounted in the cabinet 10. The telescopic mounting bracket generally designated by reference numeral 14 is employed for movably mounting the chassis 12 in the cabinet 10 and it is to be recognized that the telescopic mounting bracket 14 may be mounted along the sides or bottom of the chassis 12.

The bracket 14 includes three main parts, all formed of a flexible, resilient metal such as steel and comprises a relatively short outer track 16, a relatively long inner track 18, and a carriage 20. The outer track 16 is of a channel shape and is provided with outer side walls 22 and 24 integrally joined with a connecting wall 26. The connecting wall 26 is provided with a plurality of apertures 28 therethrough. Screws 30 or like fasteners which extend through the apertures 28 are used to fasten the outer track 16 to the cabinet 10.

The outer side walls 22 and 24 are provided with longitudinally extending grooves 32 and 34 which cooperate with the grooves 36 and 38 in the inner side walls 40 and 42 of the inner track 18 to form raceways 44 and 46. The inner side walls 40 and 42 are joined by an integral connecting wall 48 which is apertured as at 50 for reception of screws or like fasteners 52 used to secure the inner track 18 to the chassis 12 of a phonograph record player turntable.

The carriage 20 is generally of channel shape having side walls 60 and 62 interconnected by a concave base wall 64. The side wall 60 is provided with extensions 66 and 68 while the side wall 62 has extensions 70 and 72 and the base wall 64 is provided with extensions 74 and 76.

The side wall 60 is also provided with apertures 78 and 80 therein for reception of ball bearings 82, 84 while the side wall 62 is provided with apertures 86 and 88 therein for reception of ball bearings 90 and 92. The apertures are punched in their respective side walls and the excess material 98 is used to form detents to aid in retaining the ball bearings in the carriage. The ball bearings are adapted to ride in the raceways 44 and 46 and provide a sliding interconnection between the outer track 16, the carriage 20 and the inner track 18.

The ball bearings being in rolling contact with the parts defining the respective raceways are of a size compatible with and in relation to the dimensions of the inner track 18 and outer track 16 so that the inner track 18 and the outer track 16 are always under stress. The outer track 16 is placed under tension and the inner track 18 is placed under compression by action of the ball bearings. Because of the shape, material, and size of the extensions they are flexible and resilient so that they will bend with stress applied thereon so that the stress on the respective inner tracks 18 and outer track 16 is substantially equalized and a sliding fit is provided.

The extensions 74 and 76 are designed to engage stops such as at 102 and 104 formed in the ends of the outer track 16 on the connecting wall 26 thereof for preventing disengagement of the carriage from the outer track. The inner track may be provided with suitable stop pins in a conventional manner stops so as to prevent disengagement and accidental removal of the telescoping inner track 18 from the outer track 16.

It is to be recognized that the resilient extensions 66, 68 and 70, 72 normally hold the ball bearings under stress in engagement with the inner and outer tracks and serve to dampen vibrations and/or rattling. In the rare circumstance where the outer track 16 is abnormally wide and the inner track 18 is abnormally narrow such that the ball bearings are not tightly positioned therebetween, the normal outward flexing of the resilient extensions 66, 68, 70, 72 of side walls 60, 62 will compensate for reasonable variations in the dimensions of the outer track 16 and maintain the entire assembly in a rattle free condition.

The main parts of the bracket 14 can be manufactured by conventional methods. The outer and inner tracks and the carriage can be die stamped, extruded, punched or otherwise fabricated out of stock material in a single operation or in several stages.

In use, for installation, the slide assemblies are disassembled. Then a pair of outer tracks 16 are fastened to the cabinet 10 using wood screws 30 or like fasteners. The track ends are kept flush with the front of the cabinet and are mounted parallel to each other to insure proper operation. The stop 102 is at the rear of the cabinet 10 and is formed in the track 16 during manufacture. The peripheral edges of the stop 104 are punched in the track 16 during manufacture but the stop 104 is not pried from the plane of the wall 26 until the carriage has been inserted into the outer track 16. The inner tracks 18 are fastened to the chassis 12 by screws 52. The inner tracks 18 are spaced to conform to the spacing of the outer tracks.

Then, the carriage 20 is inserted into the outer track 16 and stop 104 is pried into its operating position locking the carriage against disengagement from the outer track. The chassis 12 is then placed into the cabinet with the inner tracks 18 being disposed in the carriages 20. Then stop pins may be conventionally secured to the ends of the inner tracks 18.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

A telescopic mounting bracket comprising an outer track having first and second longitudinally extending outer grooves and an inner track having first and second longitudinally extending inner grooves, the respective first and second inner and outer grooves being in opposed relation by pairs and defining longitudinally extending first and second raceways therebetween, a carriage including a base wall and first and second side walls, said first and second side walls extending substantially medially of said first and second raceways, pairs of resilient flexible extensions extending in opposite directions within said raceways from said first and second intermediate side walls, each of said extensions having ball bearing receiving and retaining means therein, ball bearings of a diameter at least as large as said raceways received within each of said means and in rolling contact with said first and second raceways, said extensions being biased outwardly to urge said ball bearings into engagement with the outer grooves of said outer track and being sufficiently flexible to provide movement of said ball bearings in a direction transverse to said raceways, the bias and flexing of said extensions establishing a rattle-proof sliding fit between said outer and inner tracks.

References Cited by the Examiner

UNITED STATES PATENTS

| | | |
|---|---|---|
| 2,542,247 | 2/51 | Gussack. |
| 2,564,658 | 8/51 | Jakeway. |
| 2,649,346 | 8/53 | Woina. |

FOREIGN PATENTS

| | | |
|---|---|---|
| 472,884 | 4/51 | Canada. |

ROBERT C. RIORDON, *Primary Examiner.*